United States Patent [19]
Fries

[11] Patent Number: 5,252,287
[45] Date of Patent: Oct. 12, 1993

[54] METHOD OF INJECTION MOLDING HOLLOW ARTICLES

[75] Inventor: Bernd Fries, Weissenburg, Fed. Rep. of Germany

[73] Assignee: Dynamit Nobel AG, Troisdorf, Fed. Rep. of Germany

[21] Appl. No.: 974,667

[22] Filed: Nov. 12, 1992

Related U.S. Application Data

[63] Continuation of Ser. No. 680,366, Apr. 4, 1991, abandoned, which is a continuation of Ser. No. 431,450, Nov. 3, 1989, abandoned.

[51] Int. Cl.⁵ .................... B29C 45/00; B29D 22/00
[52] U.S. Cl. ........................ 264/572; 264/37; 264/328.8; 264/328.12; 264/328.13
[58] Field of Search .......... 264/37, 85, 328.8, 328.12, 264/328.13, 572

[56] References Cited

U.S. PATENT DOCUMENTS

| | | | |
|---|---|---|---|
| 4,101,617 | 7/1978 | Friederich | 264/572 |
| 4,824,732 | 4/1989 | Hendry et al. | 264/37 X |
| 5,066,214 | 11/1991 | Baxi et al. | 264/572 X |
| 5,078,949 | 1/1992 | Strunk et al. | 264/572 |

FOREIGN PATENT DOCUMENTS

61-59899 12/1986 Japan .
2139548B 11/1986 United Kingdom .

*Primary Examiner*—Leo B. Tentoni
*Attorney, Agent, or Firm*—Antonelli, Terry, Stout & Kraus

[57] ABSTRACT

A method and apparatus for injection molding of thermoplastic material to form a hollow article in a closed mold in which a molten thermoplastic material is introduced from an injection nozzle into a mold cavity through an opening in the mold, and a pressurized gas is introduced together with the molten thermoplastic material through said opening so that the gas forms a hollow cavity under pressure within the thermoplastic material filling the mold. After the thermoplastic material is solidified to form a hollow article within the closed mold, the gas pressure in the hollow cavity of the article is reduced and the mold is opened. The pressurized gas is introduced into the mold from a gas source and the gas pressure is subsequently reduced by recycling at least a portion of the gas in the hollow cavity to the gas source, thereby avoiding loss of the gas to the surrounding atmosphere.

10 Claims, 6 Drawing Sheets

FIG. 6

METHOD OF INJECTION MOLDING HOLLOW ARTICLES

This application is a continuation application of application Ser. No. 680,366, filed Apr. 4, 1991, now abandoned, which is a continuation application of application Ser. No. 431,450, filed Nov. 3, 1989 (now abandoned).

BACKGROUND OF THE INVENTION

This invention relates to a method and apparatus for injection molding of thermoplastic material, especially polymers, to form a hollow molded article within a closed mold. In the method, pressurized gas for forming a hollow cavity within the hollow molded article and the thermoplastic material are injected together through an opening in the mold and the gas pressure within the hollow molded article formed in the mold is reduced by venting of the gas through the same opening. Also, in the apparatus for carrying out the method, there are provided a gas source, means for pressurizing gas from the source and introducing the gas into an injection nozzle of an injection molding machine together with molded thermoplastic material and means for recycling at least a portion of the gas retained in a hollow cavity of the article back to the gas source via the same opening in the mold.

Many methods are known for the injection molding of molten plastic materials especially resins such as polystyrene polyamides, ABS resins, polyesters, polyolefins, etc., wherein a gas is introduced into the mold cavity containing a molten resin, to form a hollow molded article having an exterior profile with enhanced surface definition.

For example, U.S. Pat. No. 4,101,617 describes a method for making a hollow shaped body from a thermoplastic resin by injection molding, wherein an amount of molten resin sufficient for forming a hollow shaped body is injected from an injection nozzle into a mold through an injection aperture; a gas under pressure is injected into the mold through the nozzle and the injection aperture to distribute molten resin over the interior surfaces of the mold; a hollow shaped body is formed in the mold having a gas-entry opening therein; the hollow shaped body is cooled and the mold and injection nozzle are separated after the shaped body has cooled below its softening point so that the interior of the hollow shaped body is opened to the atmosphere through the injection aperture of the mold and the gas-entry opening and then the mold is opened to remove the hollow shaped body.

British Patent No. 2 139 548 B discloses an injection molding apparatus and process wherein nitrogen gas in introduced into a mold during introduction of a molten resin to form a hollow cavity in a portion of the resulting injection molding or molded product. In one embodiment, an injection chamber of a screw ram is filled with sufficient molten plastics material to form the product to be molded. The screw ram is connected to a mold space provided by upper and lower parts of a mold. The molten plastics material is introduced into the mold space via a nozzle, a sprue, a runner and a gate. In order to create a pressure within the plastics material and to urge the plastics material into contact with the mold surfaces, nitrogen gas is injected into at least one selected position of the plastics material as it flows between the mold surfaces. After the molded product and the sprue have cooled and the surface skin is self-supporting, the screw ram is withdrawn and a ram for moving a piston for introducing the nitrogen is also returned to its rest position so that the gas pressure in the molded product is halved and then a valve in a line leading to the product is opened to relieve the remaining pressure of the nitrogen. The nitrogen passes to atmosphere or at least some of it is returned to a supply source. The mold is opened to remove the molding. In another embodiment, the nitrogen gas is introduced upstream of the mold space; at the upper end of a sprue formed during the molding cycle.

In these known methods, pressurized gas is vented to atmosphere and is lost. Also, the injection nozzle of the injection molding machine for injecting the molten plastic material is separated from the mold, thus requiring addition time in the molding cycle and requiring realignment of the nozzle to avoid leaks from occurring during the molding operation.

These disadvantages are overcome by the present invention.

SUMMARY OF THE INVENTION

The present invention is directed to a method for injection molding of thermoplastic material to form a hollow article in a closed mold in which a molded thermoplastic material is introduced through a nozzle orifice of a injection molding machine into a mold cavity through an opening in the mold; a pressurized gas is introduced together with the molten thermoplastic material through the opening so that the gas forms a hollow cavity under pressure within the molten thermoplastic material filling the mold; the molten thermoplastic material is solidified to form a hollow article within the closed mold; and, thereafter, the pressure of the gas in the hollow cavity is reduced prior to opening the mold; the pressurized gas is introduced into the mold from a gas source and the gas pressure is reduced by recycling at least a portion of the gas in the hollow cavity of the molded article to the gas source.

Advantageously, in accordance with the present invention, a metered amount of the molten thermoplastic material is injected into the closed mold and a metered amount of pressurized gas is injected centrally within the metered amount of thermoplastic material to form an open passage within an injection cone or sprue of molten thermoplastic material leading to the mold cavity containing the hollow article. The sprue or injection cone of molten thermoplastic material which is hardened within the opening of the mold remains attached to the hollow article and is usually removed from the hollow article by cutting during finishing.

In the method of the present invention, gas pressure within the hollow cavity of the molded article is reduced by a portion of the gas within the hollow cavity being vented via a passage remaining in the sprue of thermoplastic material attached to the hollow article to a storage tank which is maintained at a pressure lower than the gas pressure within the hollow cavity. In accordance with the present invention, the nozzle orifice of the injection molding means is firmly applied to the closed mold during both introduction of the pressurized gas and during reduction of the gas pressure. In this manner, an additional step of a conventional injection molding process is eliminated and the occurrence of leaks which may result from misalignment of the orifice nozzle in the mold opening is prevented.

In accordance with the present invention, since the gas pressure in the hollow cavity of the molded article is reduced by venting at least a portion of the gas within the hollow cavity via the opening in the mold and via a gas conduit connected to the gas source, the amount of pressurized gas released into the surrounding atmosphere during removal of the hollow molded article from the mold is greatly reduced, thus providing a cost savings to the method.

The apparatus for carrying out the injection molding method of the present invention comprises a mold, an injection molding means including an injection nozzle for injecting molten thermoplastic material into the mold, the mold having a mold cavity defining the shape of a hollow molded article to be formed therein and having an injection opening for introducing the molten thermoplastic material into the mold cavity; the injection nozzle being placed in contact with the mold and being in communication with the injection opening; a gas conduit located within said injection nozzle; gas injection means for injecting gas under pressure via said gas conduit into said mold cavity, together with the molten thermoplastic material via said opening, to form a hollow molded article of the thermoplastic material; venting means for reducing the gas pressure in the hollow molded article within the mold cavity after the molten thermoplastic material has cooled and hardened; and a gas source connected to the gas injection means and to the gas venting means.

The mold includes at least two die members defining said mold cavity which are supported by frame members that are removable by a hydraulic ram so that the die members can be held together to form the closed mold and can be moved apart to allow removal of the hollow molded article. Cooling means such as internal passages for a cooling medium or external fans may be provided for the die members.

In accordance with the present invention, the gas injection means includes a compressor for compressing gas received from the gas source, a constant pressure tank connected to the compressor for storing the compressed gas produced by the compressor and a metering means discharging a metered volume of gas from the constant volume tank into the gas conduit. The gas venting means of the present invention includes a conduit means having valve means connected to the gas conduit within the injection nozzle and to the gas source. The valve means is opened during venting of the gas from the mold and is closed during introduction of the pressurized gas into the mold cavity.

BRIEF DESCRIPTION OF THE DRAWINGS

The present invention will be further understood from the following detailed description of the method and apparatus for injection molding of a hollow molded product and the accompanying drawings wherein.

Figure 1:
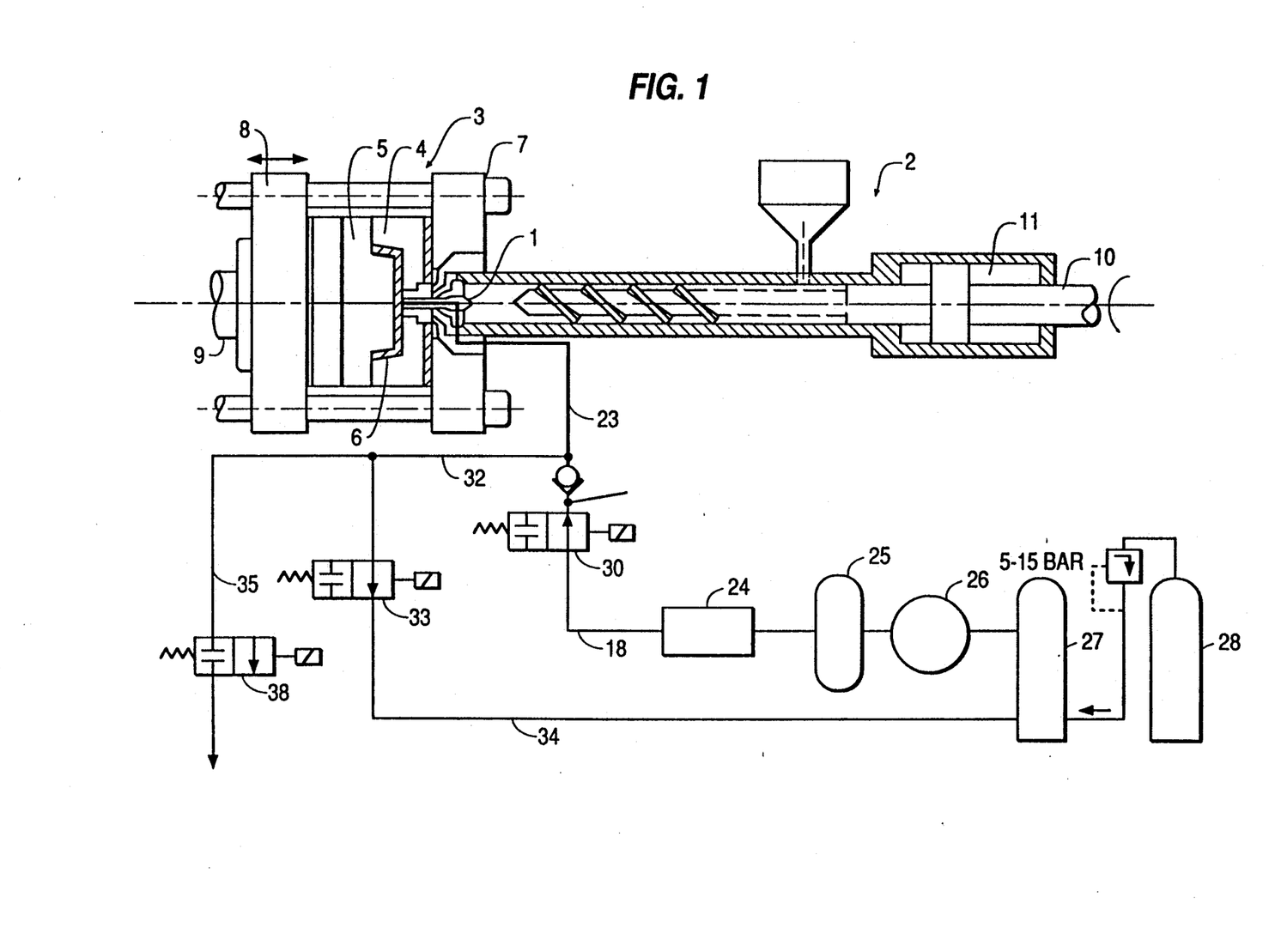
FIG. 1 is a schematic view, partially in section, of the apparatus for injection molding of a hollow molded product into the charging stage, i.e. when both inert gas and molten thermoplastic material are introduced into the closed mold.

In FIG. 1, the nozzle 1 of the injection-molding machine 2 is firmly connected to the mold 3 during the injection molding cycle. Mold 3 include female die part 4 and male die part 5 defining a mold cavity 6. Die parts 4, 5 are mounted between a stationary frame member 7 and a movable frame member 8 actuated by a piston 9 of a hydraulic ram assembly (not shown).

Figure 6:
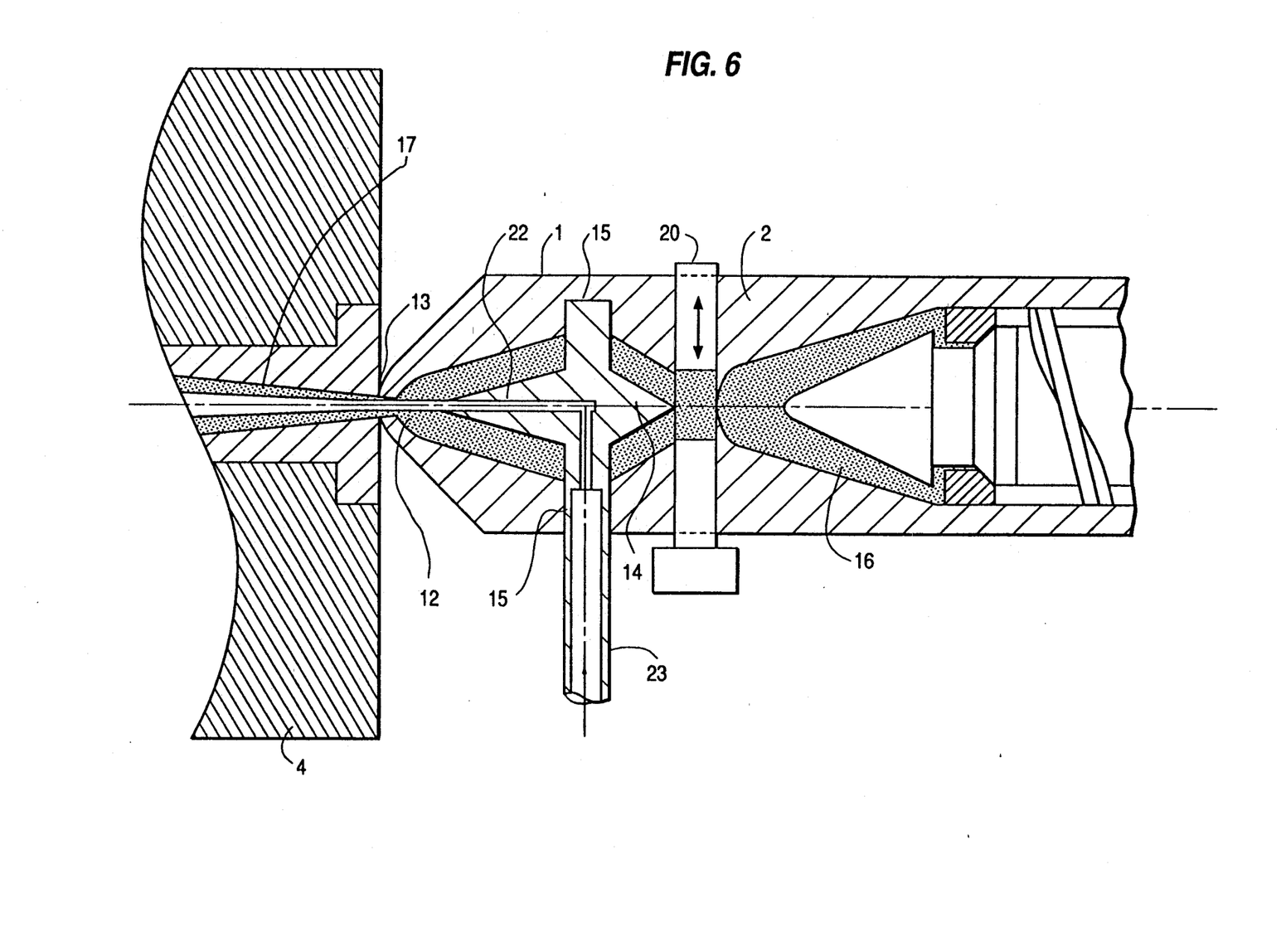
FIG. 6 is an enlarged detail schematic view, partially in section, showing the arrangement of the mold and injection molding machine, with portions of the mold frame omitted.

The injection molding machine 2 include a screw ram 10 which is rotated by drive means (not shown) and which is moved forwardly and rearwardly by a piston-cylinder unit 11. As shown in FIG. 6, nozzle 1 includes a nozzle orifice 12 that is positioned in direct fluid communication with a opening 13 in the female die part 4. An insert or torpedo-like core 14 is arranged in an end zone of the nozzle and is supported centrally in the barrel of the injection molding machine by vane-like members 15 which are spaced from each other to allow flow of the molten thermoplastic material 16.

The molten thermoplastic material introduced into the mold via nozzle orifice 12 and opening 13 passes through the runner of zone forming a sprue or injection cone 17 before entering into the mold cavity 6.

The barrel of the injection molding machine also includes a locking bar 20 which is behind the insert 14 and which is marked with a double arrow to show its transverse movement across the flow path of the molten thermoplastic material. At the beginning of the injection process, the bar is moved to the open position illustrated, by being slid upwardly. When the injection process is complete, the bar is then moved downwardly, i.e. into the closed position.

A gas conduit 22 is located within the insert 14 and has one section that extends along the longitudinal axis of the barrel to terminate within the opening 13 and another section that extend perpendicular to the axis to connect with a pipe 23 included in a gas supply and recirculation system.

A gas metering unit 24 is supplied with gas at a constant pressure from a storage tank 25 maintained at a pressure range of from about 50 to 500 bar. The tank 25 is pressurized by compressor 26 which may be powered by electricity or air. The compressor 26 is supplied at the intake side with a gas held at a charging pressure of about 5 to 15 bar in a buffer tank 27 serving as a gas source for the system.

A switching device (not shown) mounted on tank 25 switches the compressor on and off to maintain the pressure in tank 25 constant. Gas losses occurring in the entire system, including the mold, are made up by a gas reserve system 28 composed of one or more commercial gas cylinders containing an inert gas, e.g., nitrogen, with a filling pressure (max. 200 bar) that is reduced by a pressure reduction valve to the charging pressure for the compressor, i.e. 5 to 15 bar, maintained in tank 27.

Figure 2:
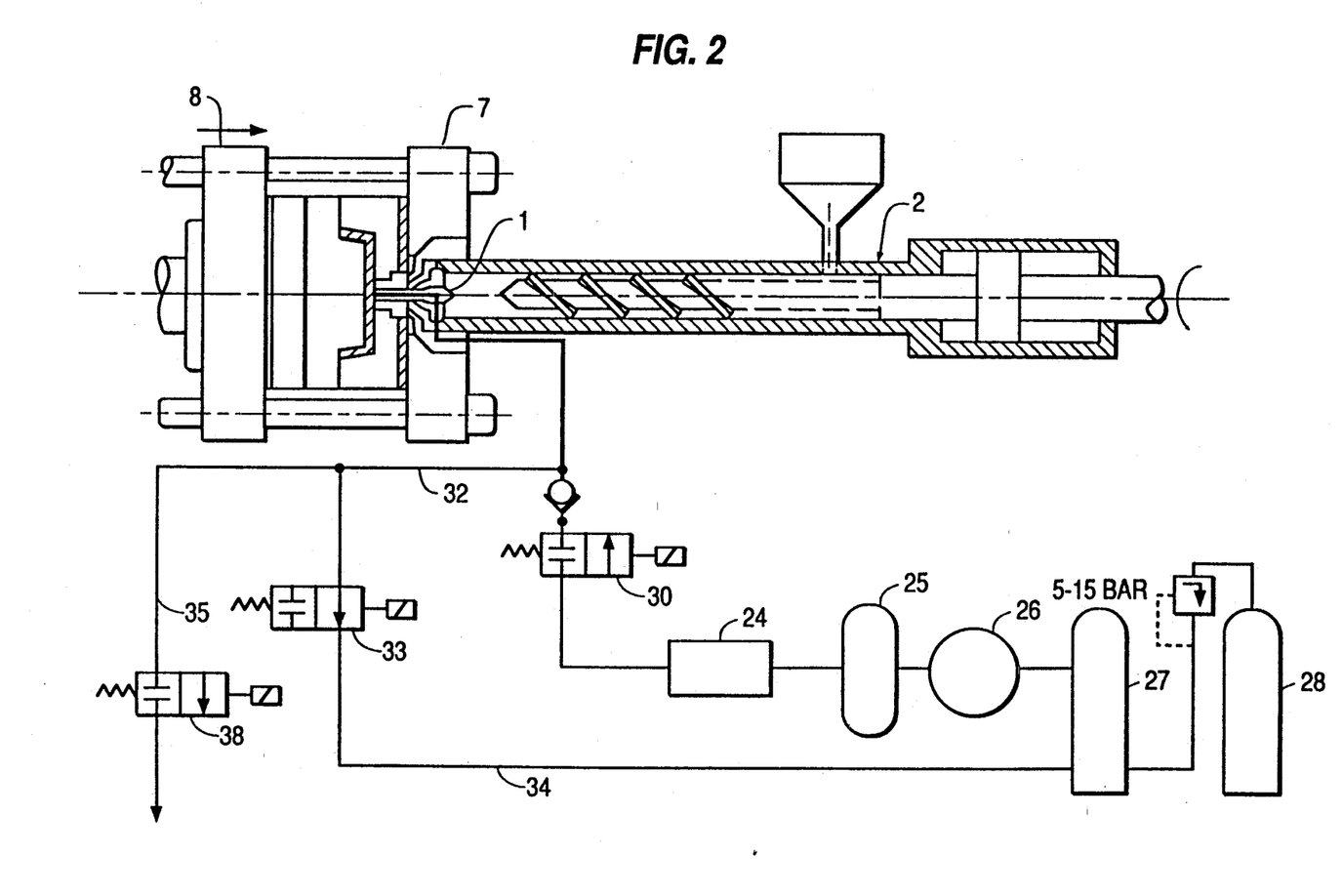
FIG. 2 is a schematic view, partially in section, of the apparatus in the stage where the introduction of gas has ceased the molded product has solidified and reduction of gas pressure in the hollow molded product is caused by recycling of the gas to the gas source.
Figure 4:
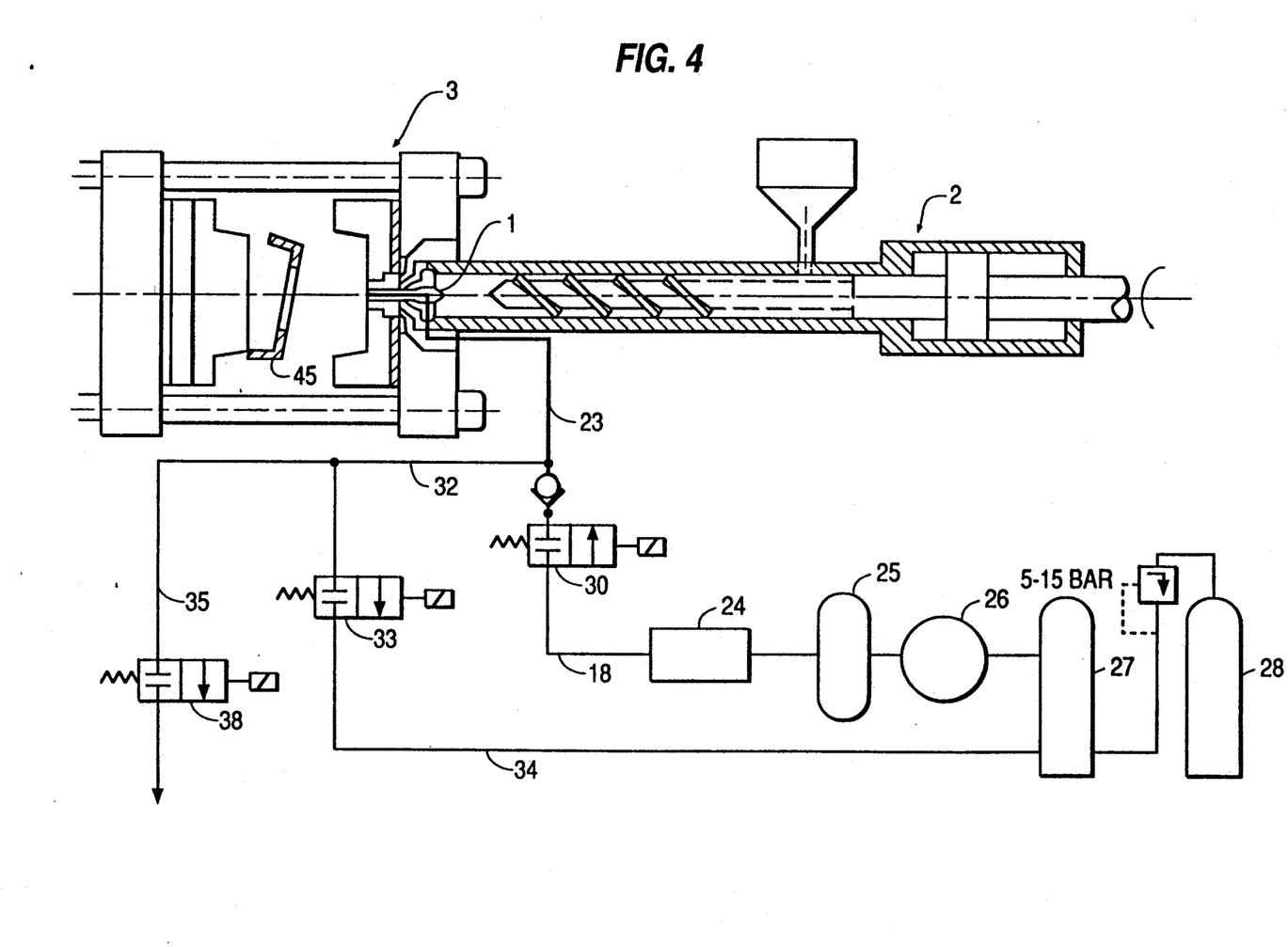
FIG. 4 is a schematic view, partially in section, of the apparatus in the stage when the mold is opened and the hollow molded product is being removed.

Conduit 18 connects the metering unit 24, the tank 25, compressor 26, and buffer tank 27 in series and serves to a first gas supply valve 30 operated by a solenoid which is actuated together with the metering unit 24 as a function of time and is then shut off. A predetermined amount of nitrogen gas is metered via valve 30 into pipe 23, through gas conduit 22, nozzle orifice 12 and opening 13 into zone forming a sprue 17 wherein the molten thermoplastic material surrounds the entering gas stream. After the thermoplastic material is forced onto the interior surfaces of the die parts, the gas pressure in the mold cavity is maintained until the molten material hardens, then as shown in FIG. 2, the gas pressure is reduced by recycling the gas through a passage in the sprue the sprue formed in the opening 13, the orifice nozzle 12, the gas conduit 22, the pipe 23, the conduit 32, solenoid-operated valve 33 and vent line 34 to buffer tank 27. The small amount of gas remaining in the hollow molded product at buffer pressure (5 to 15 bar) then escapes via the open passage in sprue 17 when the molded product is removed from the mold, valve 33 having been closed as shown in FIG. 4. This small volume of gas escapes into the surrounding atmosphere.

As shown in FIGS. 1 to 4, conduit 32 may also be connected with a conduit 35 which is connected to the solenoid-operated valve 38 to allow gas taken from within the hollow molded article to be vented to the atmosphere prior to opening of the mold.

FIG. 2 shows the arrangement of the valves 30 and 33 during venting of the gas from the hollow molded article. It will be seen that valve 30 is closed and that valve 33 is opened. Moreover, a check valve 40 is provided downstream of valve 30 to ensure that none of the venting gas will enter the metering unit 24 during the changing over from the injection of gas and the venting of gas, respectively, to and from the hollow molded article.

Figure 3:
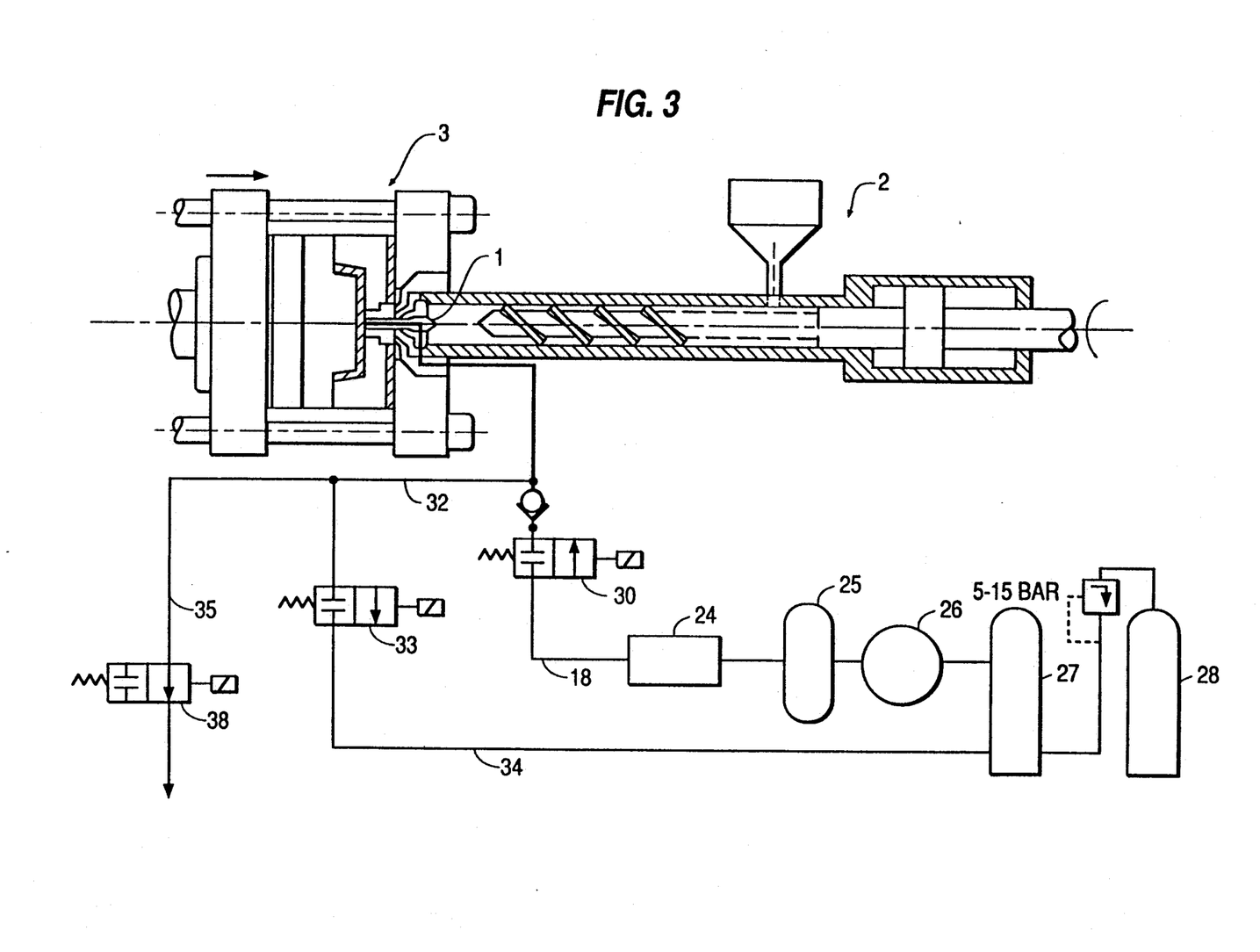
FIG. 3 is a schematic view, partially in section, of the apparatus in a stage where a small amount of residual gas in the hollow molded product is vented to atmosphere.

FIG. 3 illustrates the arrangement of valves 30, 33 and 38 when the pressure in the hollow molded article is reduced to atmospheric pressure. It will be appreciated that in the arrangement shown in FIG. 2, the pressure in the hollow molded article is reduced to the same pressure as in the gas source, namely from 5 to 15 bar. The residual gas in the hollow article can be either vented during opening of the mold or via valve 38, as heretofore described.

FIG. 4 illustrates the position of valves 30, 33 and 38, namely in the closed position during opening of the mold. At this time, any very small amount of residual gas remaining in the molded article can vent through the sprue or injection cone remaining attached to the molded article.

Figure 5:
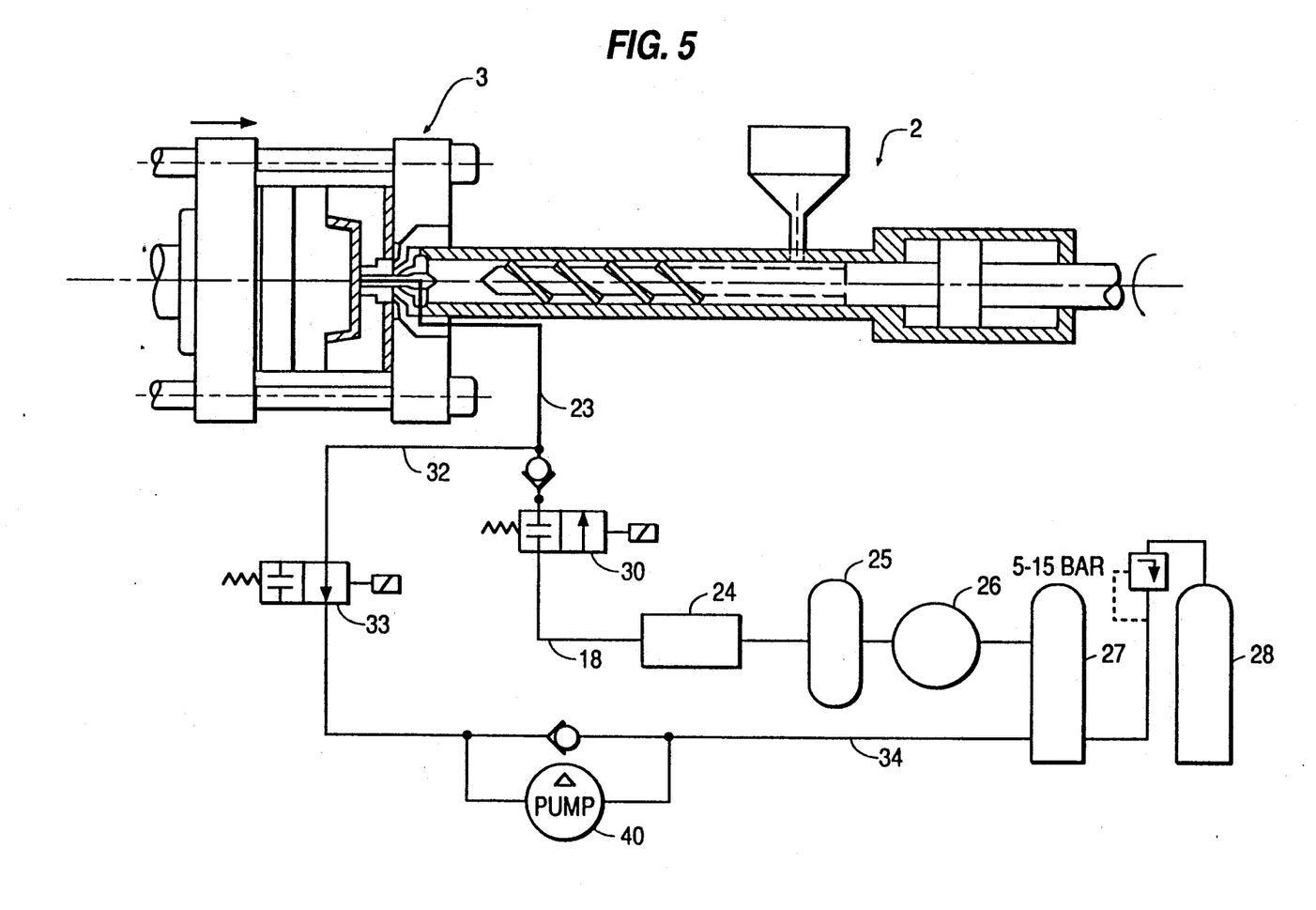
FIG. 5 is a schematic view, partially in section, of an alternative embodiment of the apparatus for production of large hollow molded products wherein a pump or low pressure compressor is used to provide the additional degassing needed to reach atmosphere pressure in the products.

FIG. 5 illustrates an alternative arrangement wherein a low pressure compressor or pump 40 is included in the vent line 34 to facilitate removal of residual gas remaining in a large molded article prior to opening of the mold.

It will be appreciated that various inert gases such as nitrogen, argon, or mixtures thereof, may be employed in the method of this invention and that numerous thermoplastic materials including polyamides, polyester, polyethylene acrylic resins, etc., can be used to form the hollow molded products.

What is claimed is:

1. A method for injection molding of thermoplastic material to form a hollow article in a closed mold wherein a molten thermoplastic material is introduced through a nozzle orifice into a mold cavity through an opening in said mold; a pressurized gas at an elevated pressure is introduced together with said molten thermoplastic material through said opening so that the gas forms a hollow cavity under said elevated pressure within the thermoplastic material filling the mold; the thermoplastic material is solidified to form a hollow article within the closed mold while the gas pressure within said mold is maintained at said elevated pressure; and, thereafter, the pressure of the gas in the hollow cavity is reduced prior to opening the mold; said pressurized gas being introduced into said mold from a first gas source at the elevated pressure and the gas pressure being reduced by recycling at least a portion of the gas in the hollow cavity to another gas source at a gas pressure lower than the elevated pressure of the pressurized gas, said another gas source being connected to said first gas source via means for increasing pressure of the gas from the another gas source to said elevated pressure.

2. A method according to claim 1, wherein a metered amount of molten thermoplastic material is injected into the closed mold via said nozzle orifice and a metered volume of pressurized gas is injected centrally within the metered amount of the thermoplastic material via a gas conduit extending through said nozzle orifice and into the injection opening of said mold to form an open passage within a sprue of thermoplastic material attached to said hollow article.

3. A method according to claim 2, wherein said sprue of thermoplastic material is formed within the opening in said mold.

4. A method according to claim 2, wherein gas pressure within said hollow cavity is reduced by a portion of the gas within the hollow cavity being removed via said passage to the another gas source comprising a storage tank maintained at a pressure lower than said gas pressure within said hollow cavity.

5. A method according to claim 1, wherein the molten thermoplastic material and the pressurized gas are introduced into said mold cavity through the nozzle orifice of an injection molding means attached to the closed mold and in communication within said opening during both introduction of the pressurized gas and during reduction of said gas pressure.

6. A method according to claim 5, wherein the pressurized gas is introduced into said mold cavity via a gas conduit which extends within said nozzle orifice and which is in communication with said first gas source.

7. A method according to claim 1, wherein a gas for injection molding is stored in the another gas source comprising a tank at a pressure lower than the gas pressure of said hollow cavity, the stored gas is compressed in a compressor connected to the first gas source and to the tank and is stored in said first gas source to provide the pressurized gas to be introduced into said mold cavity and the pressurized gas is metered from said first gas source into said mold cavity via a metering unit and via said opening.

8. A method according to claim 1, wherein the gas pressure in said hollow cavity is reduced by discharging at least a portion of the gas within said hollow cavity via said opening and via a conduit means connected to said another gas source whereby the amount of pressurized gas released into the surrounding atmosphere during removal of the hollow article from the mold is greatly reduced.

9. A method according to claim 1, wherein a small portion of the gas within said hollow cavity is vented to the atmosphere via a sprue of thermoplastic material attached to the hollow article during removal of the hollow article from the mold.

10. A method according to claim 7, wherein gas pressure within the another gas source is maintained at a range of from 5 to 15 bar; whereas gas pressure within the first gas source is maintained at a pressure of 50 to 500 bar.

* * * * *